United States Patent [19]

Kammeraad

[11] Patent Number: 4,825,583
[45] Date of Patent: May 2, 1989

[54] FISHING LINE RELEASE

[75] Inventor: James A. Kammeraad, Holland, Mich.

[73] Assignee: K-Line Industries, Inc., Holland, Mich.

[21] Appl. No.: 222,922

[22] Filed: Jul. 22, 1988

[51] Int. Cl.$^4$ ............................................. A01K 91/00
[52] U.S. Cl. .................................................. 43/43.12
[58] Field of Search ............................ 43/43.12, 27.4

[56] References Cited

U.S. PATENT DOCUMENTS

| | | | |
|---|---|---|---|
| 3,026,646 | 3/1962 | Weaver | 43/43.12 |
| 4,428,142 | 1/1984 | Shedd | 43/43.12 |
| 4,538,373 | 9/1985 | Rogers | 43/43.12 |
| 4,574,516 | 3/1986 | Shedd | 43/43.12 |
| 4,574,518 | 3/1986 | Shedd | 43/43.12 |
| 4,698,933 | 10/1987 | Shaw | 43/43.12 |
| 4,702,033 | 10/1987 | Shaw | 43/43.12 |

*Primary Examiner*—Gene P. Crosby

[57] ABSTRACT

A fishing line release which includes a pair of opposed pincer members each having a tail, a body, a neck and a jaw. The pincer members are interconnected at their tails for movement between a position in which the jaws are open and a position in which the jaws are closed. The necks are of a reduced transverse dimension and are juxtaposed to one another such that each jaw extends transversely across both necks. A portion of the jaw of each pincer member closely overlies the neck of the opposed pincer member for movement thereacross, such that a gap is defined therebetween. A guard flange projects rearwardly from each jaw, along the side of the neck of the opposed pincer member, to thereby obviate the risk of the fishing line becoming entangled within the gaps formed between the jaws and necks of the opposed pincer members.

9 Claims, 2 Drawing Sheets

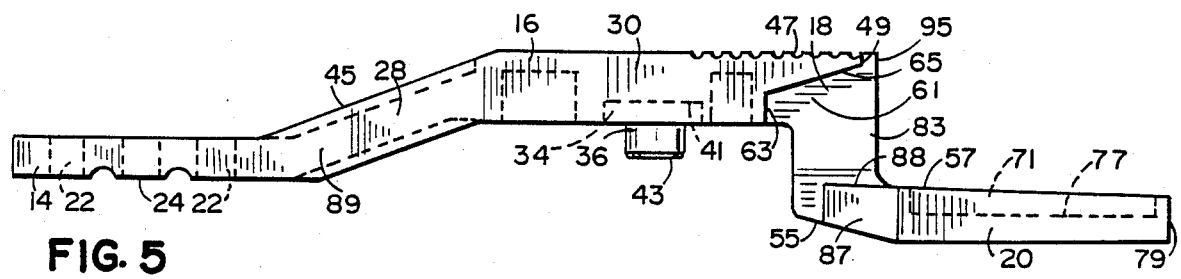
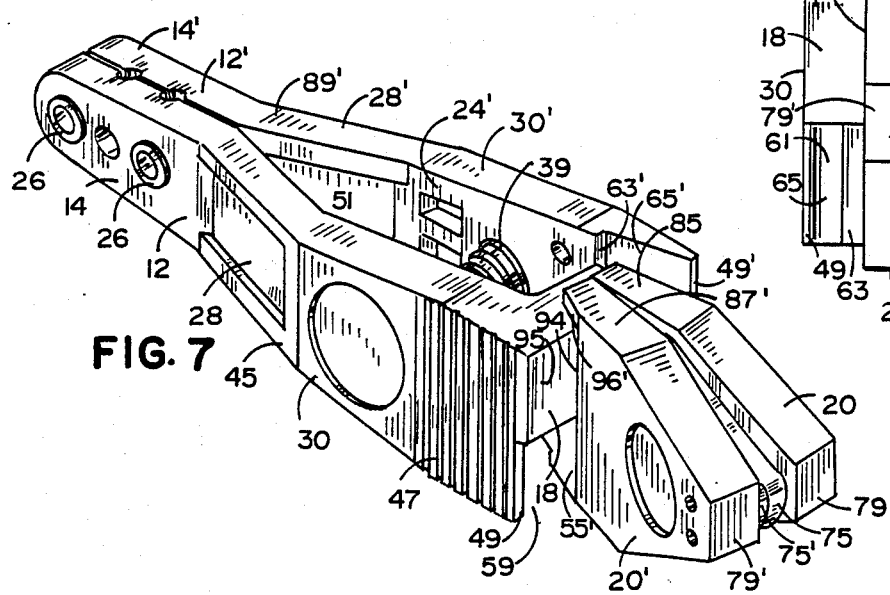
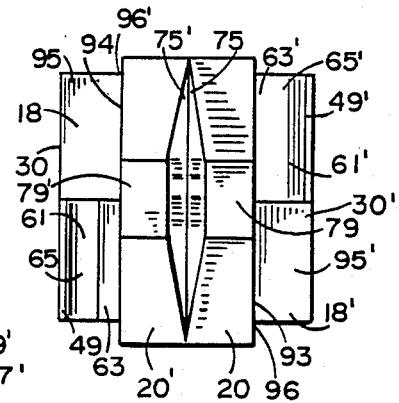
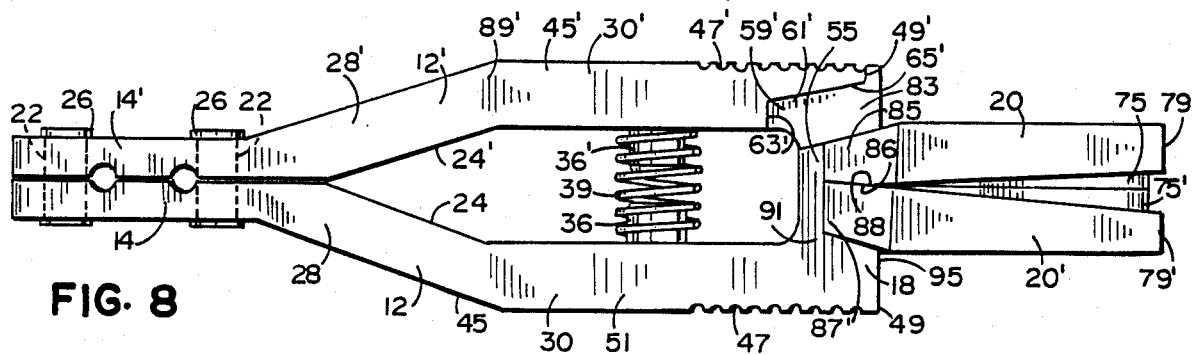
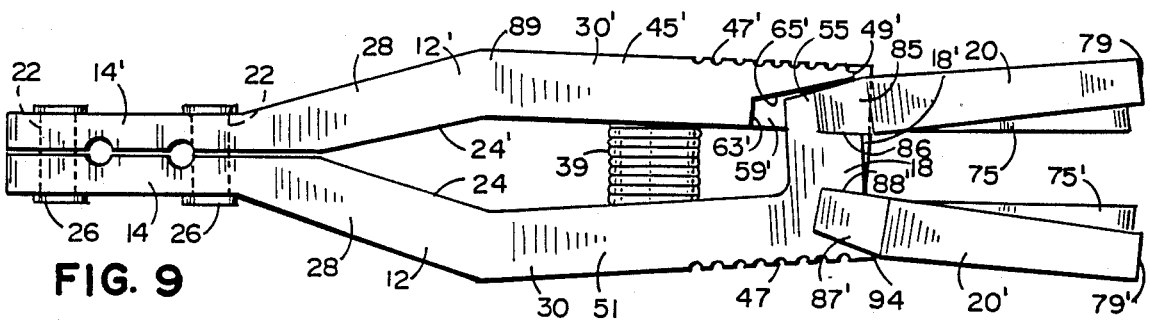

FISHING LINE RELEASE

BACKGROUND OF THE INVENTION

The present invention pertains to fishing line releases, which are particularly useful in offshore fishing. When participating in offshore fishing from a fishing boat, it is common to use both downriggers and outriggers. The former accessories, as will be readily appreciated by those skilled in the art, permit the lure to be fished at a predetermined depth by releasably attaching the fishing line to a weight supported from the boat by a separate cable and reel assembly. The latter accessories, as will also be readily appreciated by those skilled in the art, permit the lure to be fished from a point laterally spaced from the boat by releasably attaching the fish line at the outer extremity of a rod or pole-like member which extends from the boat in a direction generally perpendicular to its fore-aft axis. The releases, which attach the line to the outrigger or the downrigger weight are typically frictional in nature. A fishing line release must have sufficient frictional grip to hold the fishing line during trolling or the like, and also be able to release the fishing line when the lure has been struck by a fish.

Typically, a pincer-type fishing line release includes a pair of opposed pincer members each having a body portion and a jaw offset but connected thereto via a neck portion having a reduced transverse dimension. The releases operate such that as the body portions are moved toward one another, the corresponding jaws are separated. The difficulty which arises in connection with these devices is due to a gap which exists between the jaw of one pincer member and the adjacent neck portion of the other pincer member. More specifically, if the fishing line becomes oriented along the base of the jaws, through initial positioning or other movement due to trolling or striking by the fish, the fishing line can become lodged within this gap. This result will frustrate the objective of the release, in that the fishing line will be hopelessly entangled with the release and thereby remain attached to the downrigger line. At worst, the fishing line breaks. At best, the release must be hauled in and the line disentangled therefrom, significantly decreasing the fisherman's enjoyment of the sport.

In an effort to alleviate the difficulties encountered in using these pincer-type releases, one suggestion has been set forth in U.S. Pat. No. 4,698,933 issued Oct. 13, 1987 to Shaw, and entitled FISHING LINE RELEASE. In this device, each jaw is provided with a projection near one side thereof and an aperture on the other side thereof, such that the projection of one jaw is received within the aperture of the other jaw when the jaws are closed. These projections act as barriers which abut the fishing line and preclude the possibility of the fishing line becoming entangled in the gaps formed between the jaws and necks as discussed above. However, this construction makes for a cumbersome manufacturing process since it requires that the projections on each jaw be aligned in their corresponding apertures. Further, despite the addition of the projections, the fish line can still be trapped behind the pad. Also, since the projections are tall and spindly, they are susceptible to breakage.

SUMMARY OF THE INVENTION

The aforementioned problems are overcome in the present invention, wherein a unique interlocking structure between the two pincer members is provided to obviate the persistent problem of entangling the fishing line in the release.

A fishing line release of the present invention includes a pair of opposed pincer members fastened together at one end and having aligned jaws at their opposite free ends. The jaws of this arrangement are provided with an interlocking structure which wraps around the adjacent neck portion of the opposing pincer member. By so passing the jaw member along the side of the adjacent neck portion, the risk of entangling the fishing line in the gap therebetween is virtually eliminated. Moreover, the objective is achieved through a strong, durable and easily manufactured and assembled structure. This present design eliminates the entangling problem, without the use of elongated projections needing to be aligned with corresponding apertures, and without the susceptibility of disrepair by having weak members which may be easily broken off.

These and other objects, advantages and features of the present invention will be more fully understood and appreciated by reference to the written specification and appended drawings.

BRIEF DESCRIPTION OF THE DRAWINGS

FIG. 5 is a rear elevational view of a pincer member of the present invention, without an engagement pad;

FIG. 6 is an end view of the present invention;

FIG. 7 is a perspective view of the present invention;

FIG. 8 is a front elevational view of the present invention in a closed position; and FIG. 9 is a front elevational view of the present invention in an open position.

DETAILED DESCRIPTION OF THE PREFERRED EMBODIMENT

Figure 1:
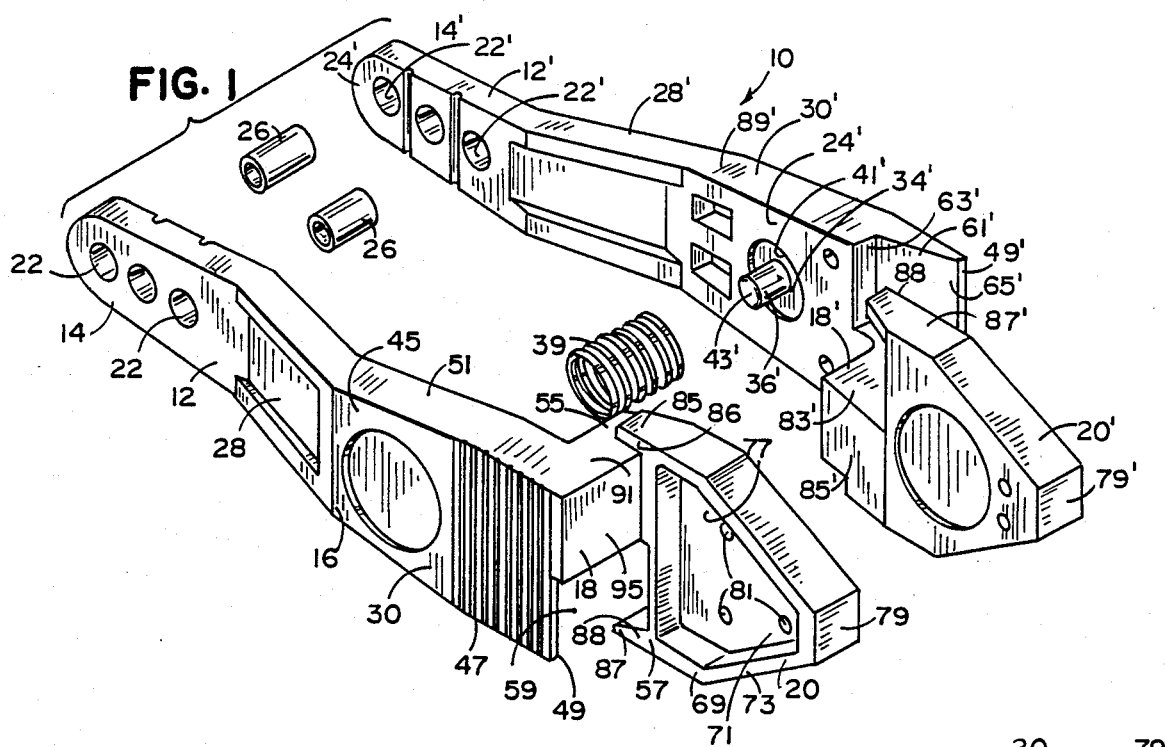
FIG. 1 is an exploded perspective view of the present invention, without the engagement pads.
Figure 2:
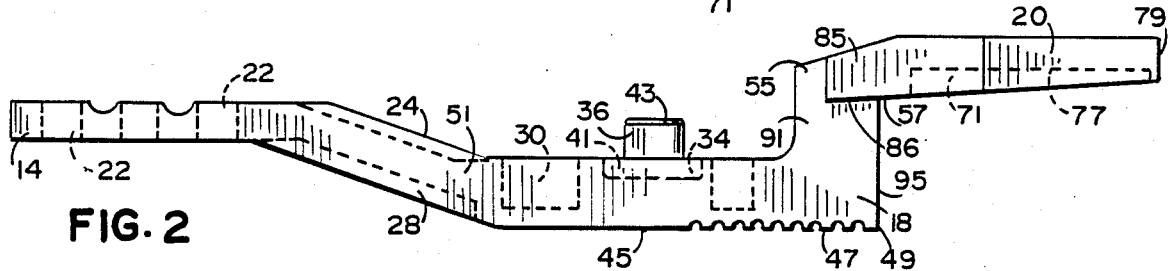
FIG. 2 is a front elevational view of a pincer member of the present invention, without an engagement pad.
Figure 3:
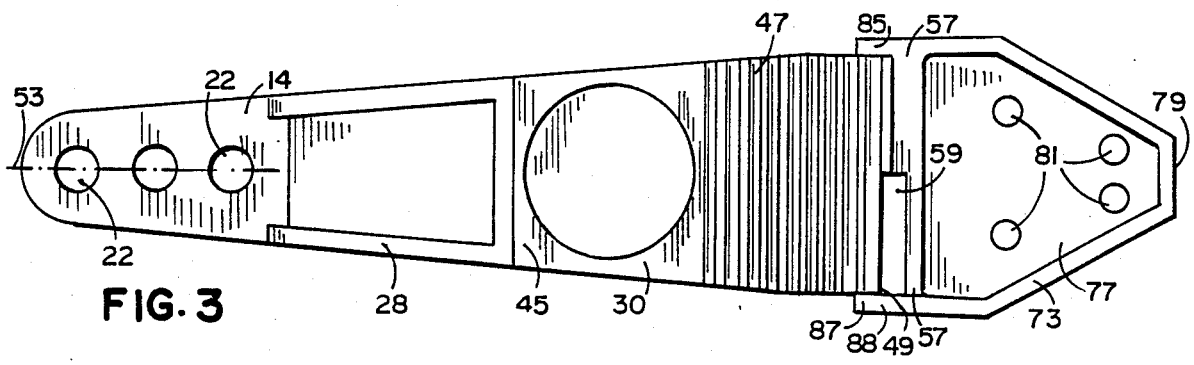
FIG. 3 is a top plan view of a pincer member of the present invention, without an engagement pad.

In a preferred embodiment, a pincer-type fishing line release 10 having a unique interlocking structure is provided to give a reliable and durable operation. Release 10 is fabricated from a pair of identical pincer members 12, 12' which are interconnected and interlocked for frictionally grasping a fishing line. Each pincer member is an elongated molded member, preferably composed of a plastic material such as Lexan 10% fiber filled, but could be composed of other materials possessing the requisite characteristics. Each pincer member 12 includes a tail 14, a body 16, a neck 18 and a jaw 20.

Tail 14 is preferably a flat planar portion at one end of pincer member 12. Centrally located and aligned longitudinally therealong are a plurality of bores 22 extending completely therethrough. When assembled, inner surfaces 24, 24' of the two pincer members 12, 12' to be assembled, are abuttingly engaged with one another, such that bores 22, 22' are aligned for receiving therethrough a pair of rivets 26 or other fastening members.

Fixedly attached to tail 14 and extending longitudinally therefrom is body 16. Body 16 includes an offsetting portion 28 and a main body portion 30 which are interconnected to form a substantially shallow V- shaped configuration. More specifically, main body portion 30 is oriented in an offset but substantially parallel relationship to tail 14. Offsetting portion 28 interconnects tail 14 and main body portion 30 and attaches to each at an angle of approximately thirty degrees, although a variety of different angles could be used.

On the inner surface 32 of main body portion 30 is provided a circular recess 34 having a central projection 36 which is fixedly attached concentrically therein. Received in the recess 34, 34' of each pincer member 12, 12' is a compression spring 39. Spring 39 abuts the recessed wall 41 of each circular recess 34 and applies an outward biasing force to the coupled pincer members 12, 12'. Projections 36, 36' are received within the coils of spring 39, but are of a length such that they do not engage each other when pincer members 12, 12' are normally biased apart.

Due to the resiliency of the pincer members 12, 12', main body portions 30, 30' may be moved against the bias of spring 39, in a direction toward one another. Projections 36 are dimensioned so that at a predetermined point their end faces 43, 43' abut and resist any further compression of spring 39. This acts as a safety measure so that spring 39 is not subjected to overcompression, which would tend to weaken and prematurely ruin spring 39.

Along the outer surface 45 of main body portion 30 is provided a roughened surface 47 oriented at distal end 49. Roughened surface 47 provides a better engagement surface with which the user may place his thumb and fingers in compressing the release 10. Roughened surface 47 is preferably situated at distal end 49, which is furthest from the coupled tail 14, in order to provide the maximum leverage possible. Also, the roughened surface 47 extends across the entire width of release 10 in order to present a broad grasping surface and to alleviate the tendency the release may otherwise have to roll as it is pinched.

Neck 18 is fixedly attached to main body portion 30 and extends inwardly from inner surface 24 in substantially the same direction as projection 36. Neck 18 has a reduced transverse dimension such that it is one-half the width of main body portion 30 at distal end 49. More specifically, neck 18 is offset to one side such that it extends between the front side surface 51 of pincer member 12 and the longitudinal axis 53 thereof.

Jaw 20 forms the free end of pincer member 12 and is fixedly attached to the inward end 55 of neck 18. Jaw 20 is oriented in a parallel or near parallel relationship with main body portion 30 and tail 14. Further, jaw 20 is offset from main body portion 30 a distance greater than the distance between main body portion 30 and tail 14.

Jaw 20 is provided with a wide base 57 which is slightly larger than the width of main body portion 30 at distal end 49. Since neck 18 is of a reduced transverse dimension as discussed above, an opening 59 is defined adjacent neck 18, between jaw 20 and main body portion 30. Further, in defining opening 59, main body portion 30 is provided with a cutaway portion 61 along inner surface 24 adjacent neck 18. Cutaway portion 61 is preferably defined by a perpendicular wall 63 and a tapering surface 65, which gradually narrows the height of main body portion 30, as surface 65 approaches distal end 49. In the most preferred embodiment, tapering surface 65 narrows to such an extent that it intersects outer surface 45 at distal end 49. As will be explained more fully below, gap 59 facilitates the opening and closing of fishing line release 10 when pincer members 12, 12' are in their assembled position.

Jaw 20 is provided with a cavity 71 in its top surface 69. Cavity 71 covers substantially the entire top surface 69 such that a raised peripheral rim 73 is thereby defined. Cavity 71 is adapted to receive therein an engagement pad 75 which is designed to engage and frictionally hold the fishing line. Engagement pad 75 is preferably composed of a polymeric material, such as Loetite 414, but could, of course, be composed of a variety of different materials having the requisite characteristics.

The recessed surface 77 of cavity 71 is set at an inclination such that cavity 71 is deeper at base 57 than at the narrowed nose portion 79. Since engagement pad 75 is substantially the same depth throughout its length, this results in pad 75 being extended further from jaw 20 as it approaches nose 79. The depth of cavity 71 at base 57 is slightly larger than the depth of engagement pad 75 so as to alleviate any unwanted edges that could otherwise be created in jaw 20.

Preferably, engagement pad 75 is affixed to recessed surface 77 through the use of an adhesive, such as ethyl cyanoacrylate. To facilitate better engagement therebetween, recessed surface 77 may be given a roughened texture and provided with a plurality of spaced apart depressions 81. These features act to form a better gripping surface for the adhesive so that engagement pad 75 will not be easily dislodged from jaw 20.

As seen in FIGS. 6-9, pincer members 12, 12' are coupled together and interlocked to form the fishing line release 10 of the present invention. More specifically, as mentioned above, tails 14, 14' are coupled together via the use of rivets 26 or the like. At the opposing end, neck 18 of pincer member 12 is received within opening 59' of pincer member 12', and neck 18' of pincer member 12' is received within opening 59 of pincer member 12. In this coupled position, then, the rearward side surface 83, 83' of each neck 18, 18' is juxtaposed to one another. Jaws 20, 20' are aligned with each other and are oriented such that they are opened when main body portions 30, 30' are compressed toward one another (FIG. 9) and closed under the biased expansion force of compression spring 39 (FIG. 8).

Figure 4:
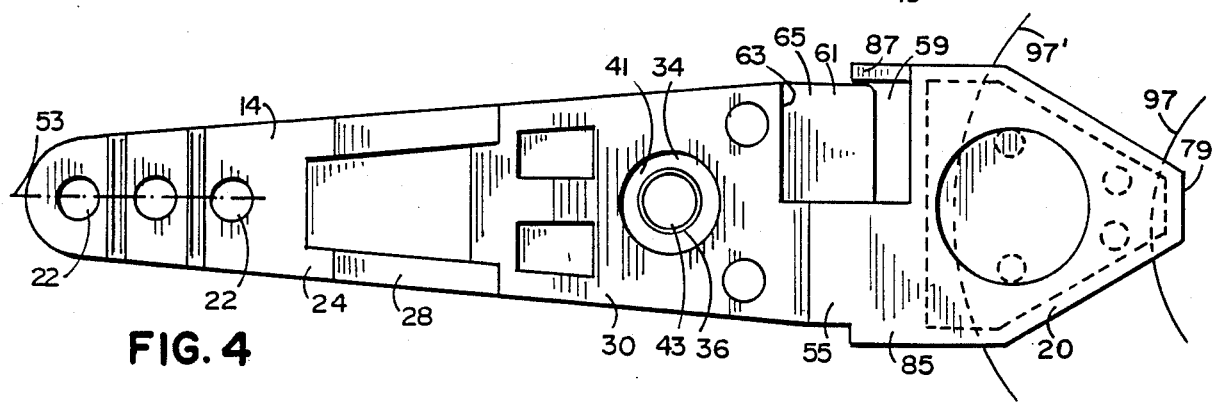
FIG. 4 is a bottom plan view of a pincer member of the present invention.

Due to the construction of the pincer jaws 20, 20', the release 10 is adapted to secure the fishing line with a variable resistance force. As can be readily appreciated, the distance the fish line must be pulled through the interface of pads 75, 75' is directly proportional to the amount of resistance experienced during release. As illustrated in FIG. 4, fish line 97 may be placed near the forward portions of pads 75, 75', adjacent nose portions 79, 79' to set a minimum amount of holding force. Conversely, fish line 97' may be placed near the rearward portions of pads 75, 75' to set a maximum amount of holding force. Also, placement of the fish line between these two locations will yield a corresponding force having a magnitude between the minimum and maximum points.

Extending outwardly from base 57 of jaw 20, in the general direction toward tail 14, are a pair of spaced apart flanges 85, 87. One flange 85 is fixedly molded along the front surface 91, at the inward end 55, of neck 18. The other guard flange 87 freely projects in a cantilever fashion from base 57, to thereby define an outer boundary for opening 59. Free guard flange 87 is positioned just outside rear side surface 89 of pincer member 12 at distal end 49. Each of the flanges 85, 87 are provided with an inwardly facing edge 86, 88. Preferably, inner edges 86, 88 are positioned flush with inner surface 69 at base 57 of jaw 20.

When the pincer members 12, 12' are coupled together, guard flange 87 is received about neck 18' such that it lies adjacent the front side surface 91' of neck 18', and guard flange 87' is received about neck 18 such that it lies adjacent the front side surface 91 of neck 18. In this position, guard flanges 87, 87' lie directly adjacent to and substantially within the same planes as fixed flanges 85', 85, respectively.

Guard flanges 87, 87' are designed specifically to obviate the risk of entrapping the fishing line within gap 93 formed between base 57 and neck 18' or gap 94 between base 57' and neck 18. More specifically, if the fishing line does by some circumstance become positioned at the bases 57, 57' of jaws 20, 20' (along faces 95, 95' of necks 18, 18') guard flanges 87, 87' will preclude any upward or downward movement of the fishing line which would position it within either gap 93 or 94. Under a normal fishing operation, it would be virtually impossible for the fishing line to be forced back against neck 18, and then up through either interface 96 between free guard flange 87 and front side surface 91' of neck 18' or interface 96' between free guard flange 87' and front side surface 91.

In use, tail 14 is attached to the downrigger weight, its supporting cable or the outrigger line by any suitable cable-swivel assembly such as that shown in the aforenoted U.S. Pat. No. 4,698,933. The user grasps the pincer members 12, 12' along their roughened surfaces 47, 47' and squeezes them together against the biasing force of compression spring 39. This action opens jaws 20 (as seen in FIG. 9) and permits the fishing line to be strung between engagement pads 75, 75'. The user then allows compression spring 39 to expand and close jaws 20 so that the fishing line is frictionally held between engagement pads 75. The release is thereafter lowered to the desired depth or shifted laterally by line and pulley to the desired point on the outrigger and trolling begins. When the line is struck by a fish, the line will be pulled free from its position between engagement pads 75, 75' leaving the fisherman free to fight and land the fish without hindrance from heavy weights, etc. Flanges 85 and 87 in combination with the overall configuration of the pincer members ensure that the line will not become entangled within the release during initial insertion, subsequent trolling or during release after a fish has struck.

Of course, it is understood that the above descriptions are those of preferred embodiments of the invention. Various other embodiments, as well as many changes and alterations, may be made without departing from the spirit and broader aspects of the invention as defined in the claims.

The embodiments of the invention in which an exclusive property or privilege is claimed are defined as follows:

1. A fishing line release comprising:
a pair of opposed pincer members, each having a body, a neck fixedly attached thereto and extending therefrom, and a jaw having a base which is fixedly attached to said neck and extends forwardly therefrom in an offset relationship to said body, said pincer members being interconnected for movement between a position in which said jaws are open and a position in which said jaws are closed;

said necks being of a reduced transverse dimension relative to said jaws and juxtaposed to one another such that the base of each said jaw extends across the width of both said necks, whereby a portion of said base of said jaw of each pincer member closely overlies for movement thereacross said neck of the opposed pincer member and thereby defines a gap therebetween; and a guard flange fixedly attached to one side of each said jaw, each said guard flange projecting rearwardly from said jaw base of each said pincer member to thereby extend closely along an outer side surface of said neck of the opposed pincer member, whereby said guard flange eliminates the risk of entangling the fishing line within the gaps formed between the jaws and necks of the opposed pincer members.

2. The fishing line release of claim 1 in which each said jaw includes an inner surface, whereby said fishing line is held between said inner surfaces of said jaws of said opposed pincer members, and each said guard flange includes an inner edge which is flush with said inner surface of said corresponding jaw at said base.

3. The fishing line release of claim 2 further including a cavity provided on the inner surface of each said jaw and an engagement pad affixed within each said cavity, each said engagement pad including an engagement surface, said engagement surfaces being engaged with each other in said closed position and adapted to frictionally hold said fishing line therebetween, each said cavity having a depth at said base of said jaw such that said engagement surface of said engagement pad is flush with said inner surface of said jaw at said base thereof, whereby the risk of entangling the fishing line behind the pads is obviated.

4. The fishing line release of claim 1 in which each said jaw includes a second side opposite said side having said guard flange, and further including a fixed flange which projects rearwardly from said base of each said jaw and is fixedly attached to said base and an outer side surface of said neck mounting said jaw, said fixed flange is positioned to engage said guard flange of the opposed pincer member in said closed position.

5. A fishing line release comprising:
a pair of opposed pincer members having opposite ends, each pincer member having a tail at one end thereof, a body, a neck fixedly attached to said body and extending outwardly therefrom, and a jaw having a base which is fixedly attached to said neck and extends forwardly therefrom in an offsetting relationship to said body to define the other end of said pincer member;

means for interconnecting said tails of said opposed pincer members;

bias means for normally biasing said bodies of said opposed pincer members apart;

said neck of each said pincer member being received between one end of said body and said base of said jaw, and being of a reduced transverse dimension such that an opening is defined adjacent said neck and between said one end of said body and said base of said jaw, said neck of each said pincer member being received within said opening of said opposed pincer member, whereby a portion of said base of said jaw of each pincer member closely overlies for movement thereacross said neck of the opposed pincer member and thereby defines a gap therebetween; and a guard flange fixedly attached to one side of each said jaw, each said guard flange projecting rearwardly from said jaw base of each pincer member to thereby extend closely along an outer side surface of said neck of the opposing pincer member, whereby said guard flange eliminates the risk of entangling the fishing line within the gaps formed between the jaws and necks of the opposed pincer members.

6. The fishing line release of claim 5 in which each said jaw includes an inner surface, whereby said fishing line is held between said inner surfaces of said jaws of said opposed pincer members, and each said guard flange includes an inner edge which is flush with said inner surface of said corresponding jaw at said base.

7. The fishing line release of claim 6 further including a cavity provided on the inner surface of each said jaw and an engagement pad affixed within each said cavity, each said engagement pad including an engagement surface, said engagement surfaces are engaged with each other in said closed position and are adapted to frictionally hold said fishing line therebetween, each said cavity having a depth at said base of said jaw such that said engagement surface of said engagement pad is flush with said inner surface of said jaw at said base thereof, whereby the risk of entangling the fishing line behind the pads is obviated.

8. The fishing line release of claim 7 in which each said jaw includes a second side opposite said side having said guard flange, and further including a fixed flange which projects rearwardly from said base of each said jaw and is fixedly attached to said base and an outer side surface of said neck mounting said jaw, said fixed flange is positioned to engage said guard flange of the opposed pincer member in said closed position.

9. The pincer members of claim 8 further including a projection, having a distal end face, which extends outwardly from each said body in the direction substantially toward said body of the opposed pincer member, said projections being dimensioned such that said end faces are engaged at a predetermined point when said bodies of said opposed pincer members are moved toward each other, whereby overcompression of said bias means is precluded.

* * * * *